US012612671B2

(12) United States Patent
Zhu et al.

(10) Patent No.: US 12,612,671 B2
(45) Date of Patent: Apr. 28, 2026

(54) MULTI-LAYER COMPOSITE COLD-ROLLED STEEL PLATE AND MANUFACTURING METHOD THEREFOR

(71) Applicant: BAOSHAN IRON & STEEL CO., LTD., Shanghai (CN)

(72) Inventors: Xiaodong Zhu, Shanghai (CN); Peng Xue, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 661 days.

(21) Appl. No.: 18/012,315

(22) PCT Filed: Jun. 22, 2021

(86) PCT No.: PCT/CN2021/101581
§ 371 (c)(1),
(2) Date: Dec. 22, 2022

(87) PCT Pub. No.: WO2021/259278
PCT Pub. Date: Dec. 30, 2021

(65) Prior Publication Data
US 2023/0250502 A1 Aug. 10, 2023

(30) Foreign Application Priority Data

Jun. 24, 2020 (CN) .......................... 202010592319.3

(51) Int. Cl.
| | |
|---|---|
| *C21D 8/02* | (2006.01) |
| *B32B 15/01* | (2006.01) |
| *B32B 43/00* | (2006.01) |
| *C21D 8/0221* | (2026.01) |
| *C21D 8/0247* | (2026.01) |
| *C21D 8/0278* | (2026.01) |
| *C22C 38/00* | (2006.01) |
| *C22C 38/04* | (2006.01) |
| *C22C 38/06* | (2006.01) |
| *C22C 38/14* | (2006.01) |

(52) U.S. Cl.
CPC .......... *C21D 8/0236* (2013.01); *B32B 15/011* (2013.01); *B32B 43/00* (2013.01); *C21D 8/0226* (2013.01); *C21D 8/0273* (2013.01); *C21D 8/0278* (2013.01); *C22C 38/001* (2013.01); *C22C 38/04* (2013.01); *C22C 38/06* (2013.01); *C22C 38/14* (2013.01); *B32B 2307/536* (2013.01); *B32B 2307/54* (2013.01); *B32B 2311/30* (2013.01); *C21D 2211/001* (2013.01); *C21D 2211/005* (2013.01)

(58) Field of Classification Search
CPC .. C21D 8/0236; C21D 8/0226; C21D 8/0273; C21D 8/0278; C21D 2211/001; C21D 2211/005; C21D 1/60; C21D 2211/008; C21D 2251/02; C21D 1/18; C21D 1/26; C21D 6/005; C21D 8/021; C21D 8/0247;

C21D 8/0263; C21D 9/46; B32B 15/011; B32B 43/00; B32B 2307/536; B32B 2307/54; B32B 2311/30; B32B 15/18; B32B 33/00; B32B 2307/546; C22C 38/001; C22C 38/04; C22C 38/06; C22C 38/14; C22C 38/004; C22C 38/005; C22C 38/02; C22C 38/12

See application file for complete search history.

(56) References Cited

U.S. PATENT DOCUMENTS

| | | | |
|---|---|---|---|
| 3,849,079 A | 11/1974 | Montuelle et al. | |
| 8,137,819 B2 * | 3/2012 | Koseki .................. | B32B 15/011 |
| | | | 428/685 |
| 2018/0222536 A1 | 8/2018 | Frehn et al. | |

FOREIGN PATENT DOCUMENTS

| | | |
|---|---|---|
| CN | 102015423 A | 4/2011 |
| CN | 105074040 A | 11/2015 |
| CN | 105308203 A | 2/2016 |
| CN | 106319355 A | 1/2017 |
| CN | 106676410 A | 5/2017 |
| CN | 108504956 A | 9/2018 |
| CN | 110153185 A | 8/2019 |
| EP | 2716782 A | 4/2014 |
| EP | 3476966 A1 | 5/2019 |

(Continued)

OTHER PUBLICATIONS

International Search Report for PCT/CN2021/101581 dated Sep. 9, 2021.
International Written Opinion for PCT/CN2021/101581 dated Sep. 9, 2021.
The Extended European search report for EP App No. 21828209. 3-1103 dated Nov. 16, 2023.
JP Office Action for 2022-580166, dated Jan. 30, 2023.
Nambu S et al., "Effect of interfacial bonding strength on tensile ductility of multilayered steel composites", Composites Science and Technology, Elsevier, Amsterdam, NL, vol. 69, No. 11-12, Sep. 1, 2009, pp. 1936-1941, XP026224323, ISSN:0266-3538, DOI:10. 1016/J. COMPOSCITECH. 2009.04.013 [retrived on May 3, 2009]; Abstract, Table 1, Fig. 1, section "Experimental Procedure".

(Continued)

*Primary Examiner* — Adil A. Siddiqui
(74) *Attorney, Agent, or Firm* — Lei Fang, Esq.; Smith Tempel Blaha LLC

(57) ABSTRACT

Disclosed is a multi-layer composite cold-rolled steel plate, provided with an upper surface layer, a lower surface layer and at least one interlayer between the upper surface layer and the lower surface layer in the thickness direction of the steel plate, wherein the phase proportion of austenite in the microstructure of the upper surface layer and the lower surface layer is ≥95 %, and the at least one interlayer comprises at least one first interlayer, with the phase proportion of martensite in the microstructure of the first interlayer being ≥85 %. In addition, further disclosed is a method for manufacturing the multi-layer composite cold-rolled steel plate above, the method comprising the steps of: (1) preparing billets for various layers and assembling the billets; (2) rolling; (3) acid pickling and cold-rolling; (4) annealing; and (5) acid pickling and then heating.

18 Claims, No Drawings

(56) References Cited

FOREIGN PATENT DOCUMENTS

| | | | |
|---|---|---|---|
| JP | H02286235 | A | 11/1990 |
| JP | 06-256844 | A | 9/1994 |
| JP | 2019127632 | A | 8/2019 |
| JP | 2019524986 | A | 9/2019 |
| JP | 2019219031 | A | 12/2019 |
| KR | 20180070383 | A | 6/2018 |
| WO | 2019105264 | A1 | 6/2019 |

OTHER PUBLICATIONS

Shin S.E. et al., "Hydrogen embrittlement in multilayer steel consisting of martensitic and twinning-induced plasticity steels", Materials Science, vol. 756, May 1, 2019, pp. 508-517, XP093098841, Amsterdam, NL ISSN: 0921-5093, DOI: 10.1016/j.msea.2019.04. 085; Table 1, 2, subsection "2.1 Sample preparation", Fig. 1 of D4.
Bousziz O et al., "A Novel Strong and Ductile TWIP/Martensite Steel Composite", Advance Engineering Materials, Wiley VCH Verlac, Weinheim, DE, vol. 18. No. 1, May 8, 2015, pp. 56-59, XP072136961, ISSN: 1438-1656, DOI:10.1002/ADEM. 201500113, the whole document.

\* cited by examiner

MULTI-LAYER COMPOSITE COLD-ROLLED STEEL PLATE AND MANUFACTURING METHOD THEREFOR

CROSS-REFERENCE TO RELATED APPLICATIONS

This application is a 371 U.S. National Phase of PCT International Application No. PCT/CN2021/101581 filed on Jun. 22, 2021, which claims benefit and priority to Chinese patent application No. CN202010592319.3 filed on Jun. 24, 2020, the contents of each of the above listed applications are incorporated by reference herein in their entiries.

TECHNICAL FIELD

The present disclosure relates to a steel plate and a method for manufacturing the same, particularly to a clad steel plate and a method for manufacturing the same.

BACKGROUND ART

It is well known that a layered clad steel plate has the effect of corrosion resistance and can counteract the decrease in formability and toughness caused by the increase in the strength of the steel plate to a certain extent. The so-called layered clad plate refers to a multi-layered steel plate having layers varying obviously in structure, strength and hardness in the thickness direction of the steel plate. The rolling cladding technology is a traditional technology for manufacturing layered composite structure steel plates.

At present, three or more steel plates of different compositions and structures are used generally for the multi-layer composite structure cold-rolled steel plate in the prior art. These plates are combined by rolling to obtain a three-layer or multi-layer steel plate with varying structures.

For example, Chinese Patent No. CN102015423B published on Oct. 1, 2014 and entitled "Use of Metal Composite Material in Vehicle Structure" discloses a coilable multi-layer metal composite material manufactured by rolling. This material can be used effectively in vehicle body structures. The composite material of the invention is composed of three layers of different steel plates combined by hot-rolling to form a clad steel plate having three different structures, wherein at least one layer is an alloy steel plate whose strength is high or very high.

For another example, Japanese Patent Publication No. H7-275938 published on Oct. 24, 1995 and entitled "High-strength Clad Steel Plate With Excellent Shape Freezing Performance" discloses a high-strength clad steel plate that is advantageous to improve rebound resilience. The skin layers of the clad steel plate are made of a 500-1000 MPa high-strength steel, and the inner part is made of a 250-400 MPa low-strength steel.

For still another example, Chinese Patent Publication No. CN102015423A published on Apr. 13, 2011 and entitled "Use of Metal Composite Material in Vehicle Structure" discloses a use of a coilable multi-layer metal composite material manufactured by rolling in vehicle structures, particularly in vehicle body structures. The object of the invention is to provide a use of a metal composite material as an alternative to a homogeneous material. The composite material of the invention is a lightweight composite material and comprises three alloy steel layers, wherein at least one of the layers is formed from a high-strength or very high-strength alloy steel.

SUMMARY

One of the objects of the present disclosure is to provide a multi-layer cold-rolled clad steel plate, wherein the multi-layer cold-rolled clad steel plate is formed by combining three or more layers of steel plates in a thickness direction, and comprises at least three layers of different structure regions from its upper surface to its lower surface. The multi-layer cold-rolled clad steel plate has the characteristics of high strength, high formability and delayed-cracking resistance, can be effectively used in manufacture of automobile safety parts and structural parts, and is highly valuable and promising for popularization and application.

In order to achieve the above object, the present disclosure provides a multi-layer cold-rolled clad steel plate comprising an upper skin layer, a lower skin layer and an interlayer between the upper skin layer and the lower skin layer in a thickness direction of the steel plate, wherein the upper skin layer and the lower skin layer each comprise a microstructure having an austenite phase proportion of ≥95%; wherein the interlayer comprises at least one first interlayer, wherein the first interlayer comprises a microstructure having a martensite phase proportion of ≥85%.

In the technical solution according to the present disclosure, the multi-layer cold-rolled clad steel plate comprises an upper skin layer, a lower skin layer and an interlayer located between the upper skin layer and the lower skin layer, wherein the steel plate comprises at least three layers of different microstructure regions from the upper surface to the lower surface, wherein the different microstructure regions are further different in strength and hardness. The structure of each of the upper skin layer and the lower skin layer of the steel plate is close to a full austenite structure (austenite volume fraction ≥95%). The interlayer of the multi-layer cold-rolled clad steel plate comprises at least one first interlayer, wherein the phase proportion of martensite in the microstructure of the first interlayer is ≥85%. The rest of the structure may comprise ferrite, bainite, retained austenite, cementite and other types of precipitated phases.

As it can be seen, owing to the reasonable distribution of different structures, the multi-layer cold-rolled clad steel plate according to the present disclosure has the characteristics of high strength, high formability and delayed-cracking resistance, can be effectively used in manufacture of automobile safety parts and structural parts, and is highly valuable and promising for popularization and application.

Further, in the multi-layer cold-rolled clad steel plate according to the present disclosure, the microstructure of the first interlayer further comprises at least one of ferrite, bainite, retained austenite, cementite and precipitates.

Further, in the multi-layer cold-rolled clad steel plate according to the present disclosure, the first interlayer has a hardness HV of ≥400; and/or the first interlayer has a tensile strength of ≥1300 MPa.

Further, in the multi-layer cold-rolled clad steel plate according to the present disclosure, the interlayer further comprises at least one second interlayer, wherein the second interlayer comprises a microstructure having a ferrite phase proportion of ≥70%.

Further, in the multi-layer cold-rolled clad steel plate according to the present disclosure, the microstructure of the second interlayer further comprises at least one of ferrite, bainite, retained austenite, cementite and precipitates.

Further, in the multilayer cold-rolled clad steel plate according to the present disclosure, the interlayer comprises two second interlayers. The two second interlayers may be the same or different. The two second interlayers may be located on both sides of the first interlayer, respectively.

Further, in the multi-layer cold-rolled clad steel plate according to the present disclosure, the first interlayer has a thickness accounting for 80-95% of a total thickness of the multi-layer cold-rolled clad steel plate; and/or the upper skin layer and the lower skin layer have a combined thickness accounting for 5-20% of the total thickness of the multi-layer cold-rolled clad steel plate.

Further, in the multi-layer cold-rolled clad steel plate according to the present disclosure, the upper skin layer has a thickness accounting for 10% or less, such as 2.5-10% of the total thickness of the multi-layer cold-rolled clad steel plate.

Further, in the multi-layer cold-rolled clad steel plate according to the present disclosure, the lower skin layer has a thickness accounting for 10% or less, such as 2.5-10% of the total thickness of the multi-layer cold-rolled clad steel plate.

Further, in the multi-layer cold-rolled clad steel plate according to the present disclosure, the second interlayer has a total thickness accounting for ≤15% of the total thickness of the multi-layer cold-rolled clad steel plate.

Further, in the multi-layer cold-rolled clad steel plate according to the present disclosure, the second interlayer has a total thickness accounting for less than 15% of the total thickness of the multi-layer cold-rolled clad steel plate.

Further, in the multi-layer cold-rolled clad steel plate according to the present disclosure, the total thickness of the multi-layer cold-rolled clad steel plate is 0.7-2.5 mm.

Further, the multi-layer cold-rolled clad steel plate according to the present disclosure has an overall tensile strength of ≥1180 MPa, preferably ≥1300 MPa, such as 1300-1650 MPa.

Further, the multi-layer cold-rolled clad steel plate according to the present disclosure has an overall yield strength of ≥1050 MPa, such as 1050-1260 MPa.

Further, the multi-layer cold-rolled clad steel plate according to the present disclosure has an elongation of 5%-8%, preferably 6%-8%.

Further, the multi-layer cold-rolled clad steel plate according to the present disclosure does not crack when it is soaked in 1 mol/L hydrochloric acid for 300 hours under a stress level of 0.8*TS; preferably, the multi-layer cold-rolled clad steel plate according to the present disclosure does not crack when it is soaked in 1 mol/L hydrochloric acid for 300 hours under a stress level of 1.0*TS; more preferably, the multi-layer cold-rolled clad steel plate according to the present disclosure does not crack when it is soaked in 1 mol/L hydrochloric acid for 300 hours under a stress level of 1.2*TS.

Further, in the multi-layer cold-rolled clad steel plate according to the present disclosure, the first interlayer comprises, in addition to Fe, the following chemical elements in mass percentages: C: 0.15-0.3%, Si: 0-0.5%, Mn: 1.0-1.8%, B≤0.004%, Al: 0.02-0.1%, N≤0.005%, Ti: 0.015-0.04%.

It should be noted that the chemical elements of the first interlayer further include unavoidable impurities, such as P and S. P element may be controlled at P≤0.020%, and S element may be controlled at S≤0.005%.

Further, in the multilayer cold-rolled clad steel plate according to the present disclosure, the first interlayer has a Si content of 0.05-0.5%.

Further, in the multilayer cold-rolled clad steel plate according to the present disclosure, the first interlayer comprises 0.002%≤N≤0.005%.

In the above technical solutions, in order to impart good tensile strength and hardness to the first interlayer in the multi-layer cold-rolled clad steel plate according to the present disclosure, it's necessary to design the chemical elements in the first interlayer reasonably to ensure that the obtained multilayer cold-rolled clad steel plate has excellent performances. The above-mentioned reasonable design of the chemical elements in the first interlayer ensures that after rolling and quenching of the first interlayer, a structure dominated by martensite is formed, and it has an HV hardness of ≥400 and a tensile strength of ≥1300 MPa.

In addition, it should be noted that the first interlayer in the multi-layer cold-rolled clad steel plate according to the present disclosure may further comprise one or more of Nb and V. For example, it may comprise 0.01-0.04% by mass of Nb.

In some embodiments, based on mass percentage, the first interlayer in the multilayer cold-rolled clad steel plate according the present disclosure has an elemental composition of: C: 0.15-0.3%, Si: 0.05-0.5%, Mn: 1.0-1.8%, B≤0.004%, Al: 0.02-0.1%, N: 0.002-0.005%, Ti: 0.015-0.04%, Nb≤0.04%, P≤0.020%, S≤0.005%, and a balance of Fe and unavoidable impurities.

Of course, provided that the strength and hardness of the first interlayer is guaranteed, other types of ingredients and ranges of ingredient contents may also be employed in the composition design of the chemical elements of the first interlayer according to the present disclosure.

Further, in the multi-layer cold-rolled clad steel plate according to the present disclosure, the second interlayer comprises, in addition to Fe, the following chemical elements in mass percentages: C: 0.001-0.1%, Si: 0-1.5%, Mn: 0.1-1.8%, Al: 0.02-0.1%, N≤0.005%.

Further, in the multilayer cold-rolled clad steel plate according to the present disclosure, the second interlayer comprises Si: 0.03-1.5%.

Further, in the multilayer cold-rolled clad steel plate according to the present disclosure, the first interlayer comprises 0.002%≤N≤0.005%.

It should be noted that the chemical elements of the second interlayer further include unavoidable impurities, such as P and S. P element may be controlled at P≤0.020%, and S element may be controlled at S≤0.005%.

Accordingly, in the above technical solution, when the interlayer in the multi-layer cold-rolled clad steel plate according to the present disclosure further includes the second interlayer, in order to guarantee the performances of the second interlayer in the multi-layer cold-rolled clad steel plate according to the present disclosure, it's also necessary to design the chemical composition of the second interlayer reasonably. The above design scheme of the chemical elements of the second interlayer can effectively ensure that the phase proportion of ferrite in the microstructure of the second interlayer is ≥70%.

Of course, provided that the ferrite content in the microstructure of the second interlayer is guaranteed, other types of ingredients and ranges of ingredient contents may also be employed in the composition design of the chemical elements of the second interlayer according to the present disclosure.

Further, in the multi-layer cold-rolled clad steel plate according to the present disclosure, the second interlayer further comprises one or more of Nb, V, Ti, Mo, Cr, and B in a total amount of ≤1% by mass. In some embodiments, in the multilayer cold-rolled clad steel plate according to the present disclosure, the second interlayer comprises Nb≤0.05% and Ti≤0.05%.

In some embodiments, based on mass percentage, the second interlayer in the multilayer cold-rolled clad steel plate according the present disclosure has an elemental composition of: C: 0.001-0.1%, Si: 0.03-1.5%, Mn: 0.1-1.8%, Al: 0.02-0.1%, 0.002%≤N≤0.005%, P≤0.020%, S≤0.005%, Nb≤0.05%, Ti≤0.05%, and a balance of Fe and unavoidable impurities.

Further, in the multi-layer cold-rolled clad steel plate according to the present disclosure, the upper and lower skin layers comprise, in addition to Fe, the following chemical elements in mass percentages: C: 0.4-0.8%, Mn: 14-20%, Al: 1.0-2.0%, N: 0.001-0.003%.

Further, in the multi-layer cold-rolled clad steel plate according to the present disclosure, the upper and lower skin layers further comprise RE (i.e. rare earth elements): 0.05-0.15%.

Accordingly, it should be noted that the upper and lower skin layers also comprise unavoidable impurities, such as P and S. P element may be controlled at P≤0.020%, and S element may be controlled at S≤0.012%.

In some embodiments, based on mass percentage, the upper and lower skin layers in the multilayer cold-rolled clad steel plate according the present disclosure have an elemental composition of: C: 0.4-0.8%, Mn: 14-20%, Al: 1.0-2.0%, N: 0.001-0.003%, RE: 0.05-0.15%, P≤0.020%, S≤0.012%, and a balance of Fe and unavoidable impurities.

In the above technical solution, the chemical composition of the multi-layer cold-rolled clad steel plate according to the present disclosure is designed reasonably, so as to obtain a high manganese TWIP (twinning-induced plasticity) steel having an austenite structure at room temperature which is used for the upper skin layer and the lower skin layer. The structure of the high manganese TWIP steel is close to full austenite at both high temperature and room temperature, which can effectively prevent intrusion of hydrogen and improve the formability of the multi-layer cold-rolled clad steel plate according to the present disclosure.

Of course, in some other embodiments, by reasonably designing the chemical composition, a high manganese TWIP steel with another chemical composition or other chemical element contents may also be used as the steel for the upper and lower skin layers according to the present disclosure, so long as its structure is close to full austenite at room temperature and it has the TWIP effect.

Accordingly, another object of the present disclosure is to provide a method for manufacturing a multi-layer cold-rolled clad steel plate. Owing to reasonable design and control of the process parameters, this manufacturing method is effective in producing a multi-layer cold-rolled clad steel plate having high strength, high formability and delayed-cracking resistance, while the production cost is reduced.

To achieve the above object, the present disclosure proposes a method for manufacturing the above multi-layer cold-rolled clad steel plate, comprising steps of:

(1) Preparing blanks of layers and assembling them into a slab;

(2) Hot rolling;

(3) Pickling and cold rolling (4) Annealing: controlling an annealing temperature at 830-890° C., then cooling to 700-800° C. at a rate of 3-15° C./s, and then water cooling to a steel plate temperature of lower than 100° C.;

(5) Tempering by reheating the steel plate to 180-240° C. after pickling, wherein a tempering time is 200-600 s.

In the method for manufacturing the multi-layer cold-rolled clad steel plate according to the present disclosure, only the usual hot-rolling cladding procedure and the conventional hot-rolling, cold-rolling, and continuous annealing procedures are utilized. The hot-rolling cladding includes blooming and assembling. The conventional rolling and heat treatment include: hot rolling, pickling, cold rolling, annealing, and tempering. In the method for manufacturing the multi-layer cold-rolled clad steel plate according to the present disclosure, the core process lies in the control of the specific process parameters in annealing and tempering.

Further, in the method for manufacturing the multi-layer cold-rolled clad steel plate according to the present disclosure, in step (2), the slab is heated to 1150-1260° C., and then hot rolling is performed, wherein a finishing rolling temperature is controlled at 830-930° C., and a coiling temperature is controlled at 500-650° C.

Further, in the method for manufacturing the multi-layer cold-rolled clad steel plate according to the present disclosure, in step (4), the water cooling is performed at a rate of ≥500° C./s.

Compared with the prior art, the multi-layer cold-rolled clad steel plate according to the present disclosure and the manufacturing method therefor have the following advantages and beneficial effects:

In contrast to the prior art, the phase proportion of austenite in the microstructure of the upper and lower skin layers of the multi-layer cold-rolled clad steel plate according to the present disclosure is ≥95%. The key of the present disclosure is that the austenitic high manganese steel of the skin layers has the function of blocking hydrogen diffusion, thereby effectively reducing the hydrogen content inside the steel plate and improving the hydrogen-induced cracking resistance of the multi-layer cold-rolled clad steel plate. In addition, the austenitic high manganese steel used for the skin layers has the characteristics of high strength and ultra-high formability which can effectively improve the bending performance of the clad steel plate.

Compared with the existing multi-layer clad steel plate prepared by a conventional rolling cladding process, the multi-layer cold-rolled clad steel plate according to the present disclosure has better performances. Particularly, the phase proportion of martensite in the microstructure of the first interlayer is ≥85%. The multi-layer cold-rolled clad steel plate according to the present disclosure has ultra-high hardness and ultra-high tensile strength which effectively ensure its high-strength performances.

In summary, as it can be seen, the multi-layer cold-rolled clad steel plate according to the present disclosure has the characteristics of high strength, high formability and delayed cracking resistance, can be effectively used in manufacture of automobile safety parts and structural parts, and is highly valuable and promising for popularization and application.

In some embodiments, the interlayer in the multi-layer cold-rolled clad steel plate according to the present disclosure may further include a second interlayer having a ferrite phase proportion of ≥70%. Depending on the difference in the structure, it can not only have the effect of improving the formability of the multilayer cold-rolled clad steel plate, but also effectively reduce the hydrogen-induced cracking susceptibility of the steel plate.

Accordingly, the manufacturing method according to the present disclosure is effective in producing a multi-layer cold-rolled clad steel plate having high strength, high formability and delayed crack resistance by reasonably designing and controlling the process parameters.

DETAILED DESCRIPTION

The multi-layer cold-rolled clad steel plate and the method for manufacturing the same according to the disclosure will be further explained and illustrated with reference to the specific examples. Nonetheless, the explanation and illustration are not intended to unduly limit the technical solution of the disclosure.

Examples 1-9

The multi-layer cold-rolled clad steel plates of Examples 1-9 according to the present disclosure were all prepared by the following steps:

(1) According to the chemical compositions shown in Table 1, the blanks for the layers were prepared and assembled: the raw slab materials for the layers to be combined were rolled to thicknesses according to the thickness fractions of the layers in the clad steel plate for later use; the adjoining interfaces of the layers were cleaned to remove impurities such as oxide scales; the contact boundaries of the layers were welded and sealed, and oxygen between the layers were evacuated; and then the layers were assembled into a slab by rolling cladding.

(2) Hot rolling: the slab was heated to 1150-1260° C., and then hot rolled. The finishing rolling temperature was controlled at 830-930° C., and the coiling temperature was controlled at 500-650° C.

(3) Pickling and cold rolling.

(4) Annealing: the annealing temperature was controlled at 830-890° C.; then the steel plate was cooled to 700-800° C. at a rate of 3-15° C./s; and then the steel plate was water cooled until the temperature of the steel plate was lower than 100° C.

(5) After the steel plate was pickled, it was reheated to 180-240° C. for tempering, wherein the tempering time was 200-600 s.

Among the multilayer cold-rolled clad steel plates of Examples 1-9 according to the present disclosure, it should be noted that:

The multi-layer cold-rolled clad steel plates of Examples 1-3 each had an upper skin layer, a lower skin layer, and an interlayer between the upper skin layer and the lower skin layer. The interlayer in each of Examples 1-3 had only one first interlayer, and there was no second interlayer.

The multi-layer cold-rolled clad steel plates of Examples 4-6 each had an upper skin layer, a lower skin layer, and two interlayers between the upper skin layer and the lower skin layer. The interlayer in each of Examples 4-6 had one first interlayer and one second interlayer.

The multi-layer cold-rolled clad steel plates of Examples 7-9 each had an upper skin layer, a lower skin layer, and three interlayers between the upper skin layer and the lower skin layer. The interlayer in each of Examples 7-9 had one first interlayer and two second interlayers.

The thickness fraction of each layer in the multilayer cold-rolled clad steel plate of each of Examples 1-9 is shown in Table 1.

Table 1 lists the thickness fraction of each layer in the multi-layer cold-rolled clad steel plate of each of Examples 1-9 according to the present disclosure.

TABLE 1

| No. | Upper skin layer (%) | Second interlayer 1 (%) | First interlayer (%) | Second interlayer 2 (%) | Lower skin layer (%) |
|---|---|---|---|---|---|
| Ex. 1 | 2.5 | — | 95 | — | 2.5 |
| Ex. 2 | 5 | — | 90 | — | 5 |
| Ex. 3 | 10 | — | 80 | — | 10 |
| Ex. 4 | 2.5 | — | 80 | 15 | 2.5 |
| Ex. 5 | 5 | — | 80 | 10 | 5 |
| Ex. 6 | 5 | — | 85 | 5 | 5 |
| Ex. 7 | 2.5 | 7.5 | 80 | 7.5 | 2.5 |
| Ex. 8 | 5 | 5 | 80 | 5 | 5 |
| Ex. 9 | 5 | 2.5 | 85 | 2.5 | 5 |

Table 2-1, Table 2-2 and Table 2-3 list the mass percentages of the chemical elements in each layer in the multilayer cold-rolled clad steel plate of each of Examples 1-9 according to the present disclosure.

Table 2-1 lists the mass percentages of the chemical elements in the upper and lower skin layers in the multilayer cold-rolled clad steel plate of each of Examples 1-9. In the microstructure of the upper and lower skin layers, the austenite phase proportion (by volume) was ≥95%.

TABLE 2-1

| | (wt %, the balance is Fe and unavoidable impurities other than P and S) | | | | | | |
|---|---|---|---|---|---|---|---|
| | Chemical composition | | | | | | |
| No. | C | Mn | P | S | Al | N | RE |
| Ex. 1 | 0.5 | 15 | 0.012 | 0.002 | 1.5 | 0.001 | 0.05 |
| Ex. 2 | 0.4 | 20 | 0.01 | 0.0014 | 1.0 | 0.0025 | 0.07 |
| Ex. 3 | 0.45 | 20 | 0.012 | 0.0013 | 1.2 | 0.003 | 0.09 |
| Ex. 4 | 0.5 | 19 | 0.01 | 0.0013 | 1.4 | 0.003 | 0.10 |
| Ex. 5 | 0.55 | 18 | 0.011 | 0.001 | 1.5 | 0.003 | 0.12 |
| Ex. 6 | 0.6 | 17 | 0.012 | 0.0015 | 1.6 | 0.0023 | 0.11 |
| Ex. 7 | 0.65 | 16 | 0.01 | 0.0011 | 1.7 | 0.001 | 0.13 |
| Ex. 8 | 0.7 | 15 | 0.011 | 0.0012 | 1.9 | 0.0015 | 0.14 |
| Ex. 9 | 0.8 | 14 | 0.012 | 0.0016 | 2.0 | 0.003 | 0.15 |

Table 2-2 lists the mass percentages of the chemical elements in the first interlayer in the multilayer cold-rolled clad steel plate of each of Examples 1-9. Each first interlayer had a hardness HV of ≥400, a tensile strength of ≥1300 MPa, and a martensite phase proportion (by volume) of ≥85%.

TABLE 2-2

| | (wt %, the balance is Fe and unavoidable impurities other than P and S) | | | | | | | | | |
|---|---|---|---|---|---|---|---|---|---|---|
| | Chemical composition | | | | | | | | | |
| No. | C | Si | Mn | B | P | S | Al | N | Ti | Nb |
| Ex. 1 | 0.2 | 0.1 | 1.55 | 0.0015 | 0.01 | 0.0015 | 0.025 | 0.002 | 0.015 | 0.01 |
| Ex. 2 | 0.15 | 0.15 | 1.8 | 0 | 0.011 | 0.001 | 0.035 | 0.003 | 0.02 | 0.015 |
| Ex. 3 | 0.17 | 0.25 | 1.5 | 0.002 | 0.01 | 0.0012 | 0.045 | 0.0025 | 0.025 | 0.01 |
| Ex. 4 | 0.19 | 0.35 | 1.35 | 0.0025 | 0.012 | 0.0011 | 0.055 | 0.0035 | 0.03 | 0 |
| Ex. 5 | 0.22 | 0.45 | 1.6 | 0.0005 | 0.01 | 0.0013 | 0.065 | 0.0045 | 0.04 | 0.01 |

TABLE 2-2-continued (wt %, the balance is Fe and unavoidable impurities other than P and S)

| | Chemical composition | | | | | | | | | |
|------|------|------|------|--------|-------|--------|-------|-------|-------|------|
| No. | C | Si | Mn | B | P | S | Al | N | Ti | Nb |
| Ex. 6 | 0.24 | 0.5 | 1.75 | 0 | 0.011 | 0.0014 | 0.075 | 0.005 | 0.03 | 0.01 |
| Ex. 7 | 0.26 | 0.15 | 1.65 | 0.001 | 0.01 | 0.001 | 0.085 | 0.003 | 0.02 | 0 |
| Ex. 8 | 0.28 | 0.05 | 1.25 | 0.0035 | 0.012 | 0.0012 | 0.095 | 0.002 | 0.025 | 0.01 |
| Ex. 9 | 0.3 | 0.12 | 1.0 | 0.004 | 0.01 | 0.0015 | 0.1 | 0.0027 | 0.02 | 0.02 |

Table 2-3 lists the mass percentages of the chemical elements in the second interlayer(s) in the multilayer cold-rolled clad steel plate of each of Examples 4-9.

It should be noted that the multi-layer cold-rolled clad steel plate of each of Examples 4-6 only had one second interlayer 2, while the multi-layer cold-rolled clad steel plate of each of Examples 7-9 had both the second interlayer 1 and the second interlayer 2. In the microstructure of the second interlayer, the ferrite phase proportion (by volume) was ≥70%.

TABLE 2-3

(wt %, the balance is Fe and unavoidable impurities other than P and S)

| | | Chemical composition | | | | | | | | |
|------|------|------|------|------|------|------|------|------|------|------|
| No. | Type | C | Si | Mn | P | S | Al | N | Ti | Nb |
| Ex. 4 | Second interlayer 2 | 0.002 | 0.03 | 0.5 | 0.013 | 0.002 | 0.02 | 0.005 | 0.03 | 0.04 |
| Ex. 5 | Second interlayer 2 | 0.04 | 0.05 | 0.8 | 0.01 | 0.0012 | 0.04 | 0.0045 | 0.03 | 0 |
| Ex. 6 | Second interlayer 2 | 0.1 | 0.5 | 0.1 | 0.011 | 0.001 | 0.06 | 0.0035 | 0 | 0.04 |
| Ex. 7 | Second interlayer 1 | 0.004 | 1.5 | 1.8 | 0.013 | 0.002 | 0.1 | 0.0035 | 0.03 | 0.03 |
| | Second interlayer 2 | 0.004 | 1.5 | 1.8 | 0.013 | 0.002 | 0.1 | 0.0035 | 0.03 | 0.03 |
| Ex. 8 | Second interlayer 1 | 0.01 | 0.04 | 0.5 | 0.01 | 0.0015 | 0.04 | 0.005 | 0.03 | 0.045 |
| | Second interlayer 2 | 0.01 | 0.04 | 0.4 | 0.01 | 0.0015 | 0.04 | 0.005 | 0.03 | 0.045 |
| Ex. 9 | Second interlayer 1 | 0.03 | 0.05 | 0.3 | 0.011 | 0.003 | 0.05 | 0.004 | 0.03 | 0.05 |
| | Second interlayer 2 | 0.03 | 0.05 | 0.5 | 0.011 | 0.003 | 0.05 | 0.004 | 0.03 | 0.05 |

Table 3 lists the specific process parameters for the multi-layer cold-rolled clad steel plates of Examples 1-9.

TABLE 3

| | | Step (2) | | | | | Step (4) | | Step (5) | |
|------|------|------|------|------|------|------|------|------|------|------|
| | | | Finishing | | | | | Starting temperature | Rapid cooling | | |
| No. | Thickness (mm) | Heating temperature (° C.) | rolling temperature (° C.) | Coiling temperature (° C.) | Annealing temperature (° C.) | Cooling rate (° C./s) | of rapid cooling (° C.) | mode and rate (° C./s) | Tempering temperature (° C.) | Tempering time (s) |
| Ex. 1 | 0.7 | 1150 | 830 | 500 | 830 | 3 | 700 | Water quenching (≥500) | 180 | 600 |
| Ex. 2 | 1.2 | 1200 | 860 | 550 | 840 | 5 | 720 | Water quenching (≥500) | 200 | 400 |
| Ex. 3 | 1.5 | 1260 | 880 | 600 | 850 | 7 | 740 | Water quenching (≥500) | 220 | 300 |
| Ex. 4 | 1.0 | 1230 | 900 | 650 | 860 | 10 | 760 | Water quenching (≥500) | 240 | 250 |
| Ex. 5 | 1.6 | 1200 | 930 | 600 | 870 | 12 | 780 | Water quenching (≥500) | 220 | 200 |
| Ex. 6 | 2.0 | 1230 | 880 | 600 | 880 | 15 | 800 | Water quenching (≥500) | 200 | 200 |
| Ex. 7 | 1.9 | 1200 | 880 | 550 | 890 | 10 | 750 | Water quenching (≥500) | 220 | 250 |
| Ex. 8 | 2.3 | 1230 | 900 | 550 | 850 | 7 | 760 | Water quenching (≥500) | 200 | 400 |

TABLE 3-continued

| | | | Step (2) | | Step (4) | | | | | |
| | | | | | | | Starting | Rapid | | |
| | | | Finishing | | | | temperature | cooling | Step (5) | |
| No. | Thickness (mm) | Heating temperature (° C.) | rolling temperature (° C.) | Coiling temperature (° C.) | Annealing temperature (° C.) | Cooling rate (° C./s) | of rapid cooling (° C.) | mode and rate (° C./s) | Tempering temperature (° C.) | Tempering time (s) |
|---|---|---|---|---|---|---|---|---|---|---|
| Ex. 9 | 2.5 | 1200 | 900 | 550 | 850 | 5 | 745 | Water quenching (≥500) | 220 | 500 |

The multi-layer cold-rolled clad steel plates of Examples 1-9 obtained according to the present disclosure were subjected to various performance tests. The test results are listed in Table 4.

Table 4 lists the relevant performance parameters of the multi-layer cold-rolled clad steel plates of Examples 1-9. In the present disclosure, the overall yield strength σs, overall tensile strength σb, and elongation δ of the steel plates were measured in accordance with "GB/T 228.1-2010 Metal Materials-Tensile Test"; the minimum R/T of 90-degree bend was measured in accordance with "GB/T 232-2010 Metal Materials-Bend Test"; and the hardness was measured in accordance with "GB/T 4342-1991 Metal Materials-Vickers Microhardness Test".

TABLE 4

| No. | σs (MPa) | σb (MPa) | δ (%) | 90-degree bend minimum R/T (inside radius of curvature/ plate thickness) | Stress level 0.8*TS | Stress level 1.0*TS | Stress level 1.2*TS |
|---|---|---|---|---|---|---|---|
| Ex. 1 | 1150 | 1450 | 7 | 0.5 | ○ | ○ | ○ |
| Ex. 2 | 1050 | 1310 | 8 | 0.5 | ○ | ○ | ○ |
| Ex. 3 | 1080 | 1400 | 7 | 0.5 | ○ | ○ | ○ |
| Ex. 4 | 1120 | 1410 | 7.2 | 0.5 | ○ | ○ | ○ |
| Ex. 5 | 1200 | 1550 | 5 | 0.5 | ○ | ○ | ○ |
| Ex. 6 | 1260 | 1600 | 5 | 0.5 | ○ | ○ | ○ |
| Ex. 7 | 1130 | 1420 | 7.1 | 0.5 | ○ | ○ | ○ |
| Ex. 8 | 1190 | 1570 | 7 | 0.5 | ○ | ○ | ○ |
| Ex. 9 | 1230 | 1640 | 6 | 0.5 | ○ | ○ | ○ |

Note:
○—no cracking, X—cracking: representing the hydrogen induced cracking results when soaking the steel plates in 1 mol/L hydrochloric acid for 300 hours under a certain internal stress level.

As it can be seen from Table 4, the multi-layer cold-rolled clad steel plates of Examples 1-9 according to the present disclosure had an overall yield strength σs of 1050-1260 MPa, an overall tensile strength σb of ≥1180 MPa, and an elongation δ of 5%-8%, preferably 6%-8%. The multi-layer cold-rolled clad steel plates of Examples 1-9 didn't crack when they were immersed in 1 mol/L hydrochloric acid for 300 hours under stress levels of 0.8*TS, 1.0*TS and 1.2*TS. The multi-layer cold-rolled clad steel plates of each Example had high strength, high formability and resistance to delayed cracking.

The austenitic high manganese steel of the upper and lower skin layers of the multi-layer cold-rolled clad steel plate according to the present disclosure has the function of blocking hydrogen diffusion, thereby effectively reducing the hydrogen content inside the steel plate and improving the hydrogen-induced cracking resistance of the multi-layer cold-rolled clad steel plate. In addition, the austenitic high manganese steel used for the upper and lower skin layers has the characteristics of high strength (HV≥240) and ultra-high formability which can effectively improve the bending performance of the clad steel plate. Compared with the existing multi-layer clad steel plate prepared by a conventional rolling cladding process, the multi-layer cold-rolled clad steel plate according to the present disclosure has better performances. The first interlayer in the multi-layer cold-rolled clad steel plate according to the present disclosure has ultra-high hardness and ultra-high tensile strength which effectively ensure its high-strength performances.

In summary, as it can be seen, the multi-layer cold-rolled clad steel plate according to the present disclosure has the characteristics of high strength, high formability and delayed cracking resistance, can be effectively used in manufacture of automobile safety parts and structural parts, and is highly valuable and promising for popularization and application.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the Examples set forth above are only specific examples according to the present disclosure. Obviously, the present disclosure is not limited to the above Examples. Similar variations or modifications made thereto can be directly derived or easily contemplated from the present disclosure by those skilled in the art. They all fall in the protection scope of the present disclosure.

What is claimed is:

1. A multi-layer cold-rolled clad steel plate, wherein the multi-layer cold-rolled clad steel plate comprises an upper skin layer, a lower skin layer and an interlayer between the upper skin layer and the lower skin layer in a thickness direction of the steel plate, wherein the upper skin layer and the lower skin layer each comprise a microstructure having an austenite phase proportion of ≥95%; wherein the interlayer comprises at least one first interlayer, wherein the first interlayer comprises a microstructure having a martensite phase proportion of ≥85%;

wherein the first interlayer has a hardness HV of ≥400; and/or the first interlayer has a tensile strength of ≥1300 MPa;

wherein the upper and lower skin layers comprise, in addition to Fe, the following chemical elements in mass percentages: C: 0.4-0.8%, Mn: 14-20%, Al: 1.0-2.0%, N:

0.001-0.003%.

2. The multi-layer cold-rolled clad steel plate according to claim 1, wherein the microstructure of the first interlayer further comprises at least one of ferrite, bainite, retained austenite, cementite and precipitates.

3. The multi-layer cold-rolled clad steel plate according to claim 1, wherein the interlayer further comprises at least one second interlayer, wherein the second interlayer comprises a microstructure having a ferrite phase proportion of ≥70%; optionally, the microstructure of the second interlayer further comprises at least one of ferrite, bainite, retained austenite, cementite and precipitates.

4. The multi-layer cold-rolled clad steel plate according to claim 3, wherein the interlayer comprises two second interlayers.

5. The multi-layer cold-rolled clad steel plate according to claim 3, wherein the second interlayer has a total thickness accounting for ≤15% of the total thickness of the multi-layer cold-rolled clad steel plate.

6. The multi-layer cold-rolled clad steel plate according to claim 3, wherein the second interlayer comprises, in addition to Fe, the following chemical elements in mass percentages: C: 0.001-0.1%, Si: 0-1.5%, Mn: 0.1-1.8%, Al: 0.02-0.1%, N≤0.005%; optionally, the second interlayer further comprises one or more of Nb, V, Ti, Mo, Cr, and B in a total amount of ≤1% by mass.

7. The multi-layer cold-rolled clad steel plate according to claim 1, wherein the first interlayer has a thickness accounting for 80-95% of a total thickness of the multi-layer cold-rolled clad steel plate; and/or the upper skin layer and the lower skin layer have a combined thickness accounting for 5-20% of the total thickness of the multi-layer cold-rolled clad steel plate.

8. The multi-layer cold-rolled clad steel plate according to claim 1, wherein the multi-layer cold-rolled clad steel plate has a total thickness of 0.7-2.5 mm.

9. The multi-layer cold-rolled clad steel plate according to claim 1, wherein the multi-layer cold-rolled clad steel plate satisfies one or more of the following performances: an overall tensile strength of ≥1180 MPa, an overall yield strength of ≥1050 MPa, an elongation σ of 5%-8%, no cracking when it is soaked in 1 mol/L hydrochloric acid for 300 hours under a stress level of 0.8*TS.

10. The multi-layer cold-rolled clad steel plate according to claim 1, wherein the first interlayer comprises, in addition to Fe, the following chemical elements in mass percentages: C: 0.15-0.3%, Si: 0-0.5%, Mn: 1.0-1.8%, B≤0.004%, Al: 0.02-0.1%, N≤0.005%, Ti: 0.015-0.04%.

11. The multi-layer cold-rolled clad steel plate according to claim 1, wherein the upper and lower skin layers further comprise RE: 0.05-0.15%.

12. A manufacturing method for the multi-layer cold-rolled clad steel plate according to claim 1, wherein the method comprises steps of:
(1) Preparing blanks of layers and assembling them into a slab;
(2) Hot rolling;
(3) Pickling and cold rolling;
(4) Annealing: controlling an annealing temperature at 830-890° C., then cooling to 700-800° C. at a rate of 3-15° C./s, and then water cooling to a steel plate temperature of lower than 100° C.;
(5) Tempering by reheating the steel plate to 180-240° C. after pickling, wherein a tempering time is 200-600 s.

13. The manufacturing method according to claim 12, wherein:
in step (2), the slab is heated to 1150-1260° C., and then hot rolling is performed, wherein a finishing rolling temperature is controlled at 830-930° C., and a coiling temperature is controlled at 500-650° C.; and/or
in step (4), the water cooling is performed at a rate of ≥500° C./s.

14. The manufacturing method according to claim 12, wherein:
the microstructure of the first interlayer of the multi-layer cold-rolled clad steel plate further comprises at least one of ferrite, bainite, retained austenite, cementite and precipitates; and/or
the first interlayer has a hardness HV of ≥400; and/or
the first interlayer has a tensile strength of ≥1300 MPa; and/or
the first interlayer has a thickness accounting for 80-95% of a total thickness of the multi-layer cold-rolled clad steel plate; and/or
the first interlayer comprises, in addition to Fe, the following chemical elements in mass percentages: C: 0.15-0.3%, Si: 0-0.5%, Mn: 1.0-1.8%, B≤0.004%, Al: 0.02-0.1%, N≤0.005%, Ti: 0.015-0.04%.

15. The manufacturing method according to claim 12, wherein the interlayer of the multi-layer cold-rolled clad steel plate further comprises at least one second interlayer.

16. The manufacturing method according to claim 15, wherein:
the second interlayer comprises a microstructure having a ferrite phase proportion of ≥70%; optionally, the microstructure of the second interlayer further comprises at least one of ferrite, bainite, retained austenite, cementite and precipitates; and/or
the second interlayer comprises, in addition to Fe, the following chemical elements in mass percentages: C: 0.001-0.1%, Si: 0-1.5%, Mn: 0.1-1.8%, Al: 0.02-0.1%, N≤0.005%;
optionally, the second interlayer further comprises one or more of Nb, V, Ti, Mo, Cr, and B in a total amount of ≤1% by mass; and/or
the second interlayer has a total thickness accounting for ≤15% of the total thickness of the multi-layer cold-rolled clad steel plate; and/or
the interlayer comprises two second interlayers.

17. The manufacturing method according to claim 12, wherein:
the upper skin layer and the lower skin layer of the multi-layer cold-rolled clad steel plate have a combined thickness accounting for 5-20% of the total thickness of the multi-layer cold-rolled clad steel plate; and/or
the upper and lower skin layers comprise, in addition to Fe, the following chemical elements in mass percentages: C: 0.4-0.8%, Mn: 14-20%, Al: 1.0-2.0%, N: 0.001-0.003%, and optional RE: 0.05-0.15%.

18. The manufacturing method according to claim 12, wherein the multi-layer cold-rolled clad steel plate satisfies one or more of the following performances: an overall tensile strength of ≥1180 MPa, an overall yield strength of ≥1050 MPa, an elongation σ of 5%- 8%, no cracking when it is soaked in 1 mol/L hydrochloric acid for 300 hours under a stress level of 0.8*TS.

* * * * *